(12) United States Patent
Alapuranen

(10) Patent No.: US 7,706,390 B2
(45) Date of Patent: Apr. 27, 2010

(54) SYSTEM AND METHOD FOR ROUTING PACKETS IN A WIRELESS MULTIHOPPING COMMUNICATION NETWORK

(75) Inventor: Pertti O. Alapuranen, Deltona, FL (US)

(73) Assignee: MeshNetworks, Inc., Maitland, FL (US)

( * ) Notice: Subject to any disclaimer, the term of this patent is extended or adjusted under 35 U.S.C. 154(b) by 987 days.

(21) Appl. No.: 11/268,134

(22) Filed: Nov. 7, 2005

(65) Prior Publication Data

US 2007/0104107 A1 May 10, 2007

(51) Int. Cl.
*H04L 12/56* (2006.01)
(52) U.S. Cl. .................. 370/406; 370/407; 370/408
(58) Field of Classification Search ................. 370/238, 370/328–330, 335–338, 342–345; 455/422.1, 455/426.2, 445–449, 101, 103–105
See application file for complete search history.

(56) References Cited

U.S. PATENT DOCUMENTS

| | | | | |
|---|---|---|---|---|
| 6,542,469 B1 * | 4/2003 | Kelley et al. | ................ | 370/238 |
| 6,807,165 B2 | 10/2004 | Belcea | | |
| 6,873,839 B2 | 3/2005 | Stanforth | | |
| 6,968,130 B1 * | 11/2005 | Pan | ................ | 398/5 |
| 7,072,650 B2 | 7/2006 | Stanforth | | |
| 7,219,159 B2 * | 5/2007 | Mouri et al. | ................ | 709/241 |
| 2003/0081582 A1 * | 5/2003 | Jain et al. | ................ | 370/338 |
| 2003/0161304 A1 * | 8/2003 | deBoer et al. | ................ | 370/386 |
| 2003/0161338 A1 * | 8/2003 | Ng et al. | ................ | 370/437 |
| 2006/0013210 A1 * | 1/2006 | Bordogna et al. | ................ | 370/389 |
| 2006/0062206 A1 * | 3/2006 | Krishnaswamy | ................ | 370/352 |
| 2006/0153081 A1 * | 7/2006 | Simonsson et al. | ................ | 370/238 |
| 2008/0013511 A1 * | 1/2008 | Bender et al. | ................ | 370/338 |

OTHER PUBLICATIONS

Sklar, B. "Rayleigh Fading channels in mobile digital communications systems, Part II, Mitigation, " Communications Magazine, IEEE vol. 35, Issue 7, Jul. 1997, pp. 102-109.

* cited by examiner

*Primary Examiner*—Thai D Hoang
(74) *Attorney, Agent, or Firm*—Randi L. Karpinia

(57) ABSTRACT

A system and method for routing packets in a multihopping wireless communication network (100). The system and method selects a node (106-1) of the wireless network (100) to operate as an aggregation point, at which two or more possible routes for transmitting packets or packet fragments from a source mobile node (102-1) to a destination mobile node (102-2) meet. A primary route is selected based on historical quality of one or more links between nodes (102, 106, 107), and one or more secondary routes are selected based on the success rate of packets reaching the aggregation point.

18 Claims, 6 Drawing Sheets

SYSTEM AND METHOD FOR ROUTING PACKETS IN A WIRELESS MULTIHOPPING COMMUNICATION NETWORK

FIELD OF THE INVENTION

The present invention relates generally to wireless communication networks, and, more particularly, to a system and method for routing data in a wireless communication network by determining primary and secondary routes for the data that share a common aggregation point.

BACKGROUND

In recent years, a type of mobile communications network known as an ad-hoc network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790entitled "Ad Hoc Peer-to-Peer Mobile Radio Access System Interfaced to the PSTN and Cellular Networks", filed on Jun. 29, 2001, now U.S. Pat. No. 7,072,650, in U.S. patent application Ser. No. 09/815,157entitled "Time Division Protocol for an Ad-Hoc, Peer-to-Peer Radio Network Having Coordinating Channel Access to Shared Parallel Data Channels with Separate Reservation Channel", filed on Mar. 22, 2001, now U.S. Pat. No. 6,807,165, and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839, the entire content of each being incorporated herein by reference.

Typically, to make routing decisions, routing algorithms need some criteria pertaining to the usability or quality of the potential links between nodes. Certain existing routing algorithms for routing packets between nodes in ad-hoc networks may ignore the behavior of wireless channels. For example, in first generation wireless routing algorithms, the criteria is typically the existence of a link between nodes. In these algorithms, therefore, routing is based on optimizing the number of hops for the route. The optimal route is identified thus to be the route having the lowest total number of hops.

In second generation wireless routing algorithms, additional information is gathered, such as the reliability, bandwidth, signal strength and other such parameters, as can be appreciated by one skilled in the art. The routing algorithms use this information in a raw or filtered format to select the links that should be used for communication between nodes. Also, a simple prediction of the future parameters of the links can be performed using a linear prediction algorithm as can be appreciated by one skilled in the art. Although these algorithms may be somewhat suitable, they may not respond to quick changes in channel properties. For example, when Rayleigh fading occurs on a mobile channel because a wireless node travels into an area having many obstructions, the algorithm may not account for the fact that such fading can occur rapidly. Also, selecting a link based on a prediction algorithm before the transmission occurs may be unsuitable for transmissions that are broadcast in nature and are received by multiple destinations or intermediate nodes, since some of those nodes may be in an environment prone to fading when the transmission actually occurs.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
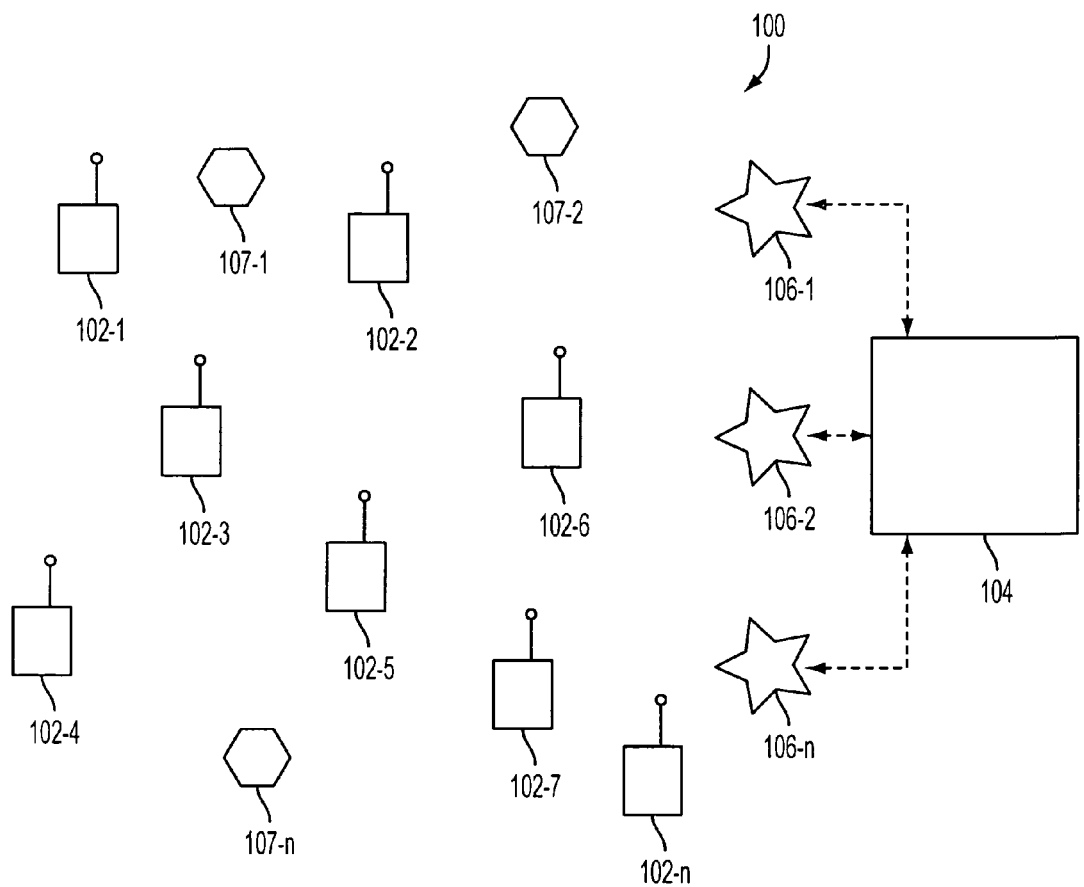
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for routing data in wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for routing data in wireless communication network. as described herein. The non-processor circuits may include, but are not limited to, a radio receiver, a radio transmitter, signal drivers, clock circuits, power source circuits, and user input devices. As such, these functions may be interpreted as steps of a method for routing data in wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for routing packets in a multihopping wireless communication network. According to the embodiments of the present invention described herein, a node of the wireless communication network is selected to act as an aggregation point, which is a point that is shared by two or more possible routes for a packet. In particular, the aggregation point is the node in the two or more paths to which the two or more paths respectively route packets or packet fragments. As discussed in more detail below, the aggregation point can combine the packets or packet fragments, and then forwards these combined packets or packet fragments along a route to the destination node.

A primary route is selected based on the historical quality of one or more links of the wireless network. A secondary route is selected based on the success rate of packets received by the aggregation point. The actual route selected for use is determined by the physical layer and channel state. This can improve link budgets and reduce the effect of fading as compared to traditional methods as discussed in more detail below.

FIG. 1 is a block diagram illustrating an example of an ad-hoc multi-hopping wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106, access points (APs) 106 or intelligent access points (IAPs) 106), for providing nodes 102 with access to the fixed network 104. The fixed network 104 can include, for example, a core local area network (LAN) or wide area network (WAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107, routers 107, wireless routers (WRs) 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165 and 6,873,839, referenced above.

Figure 2:
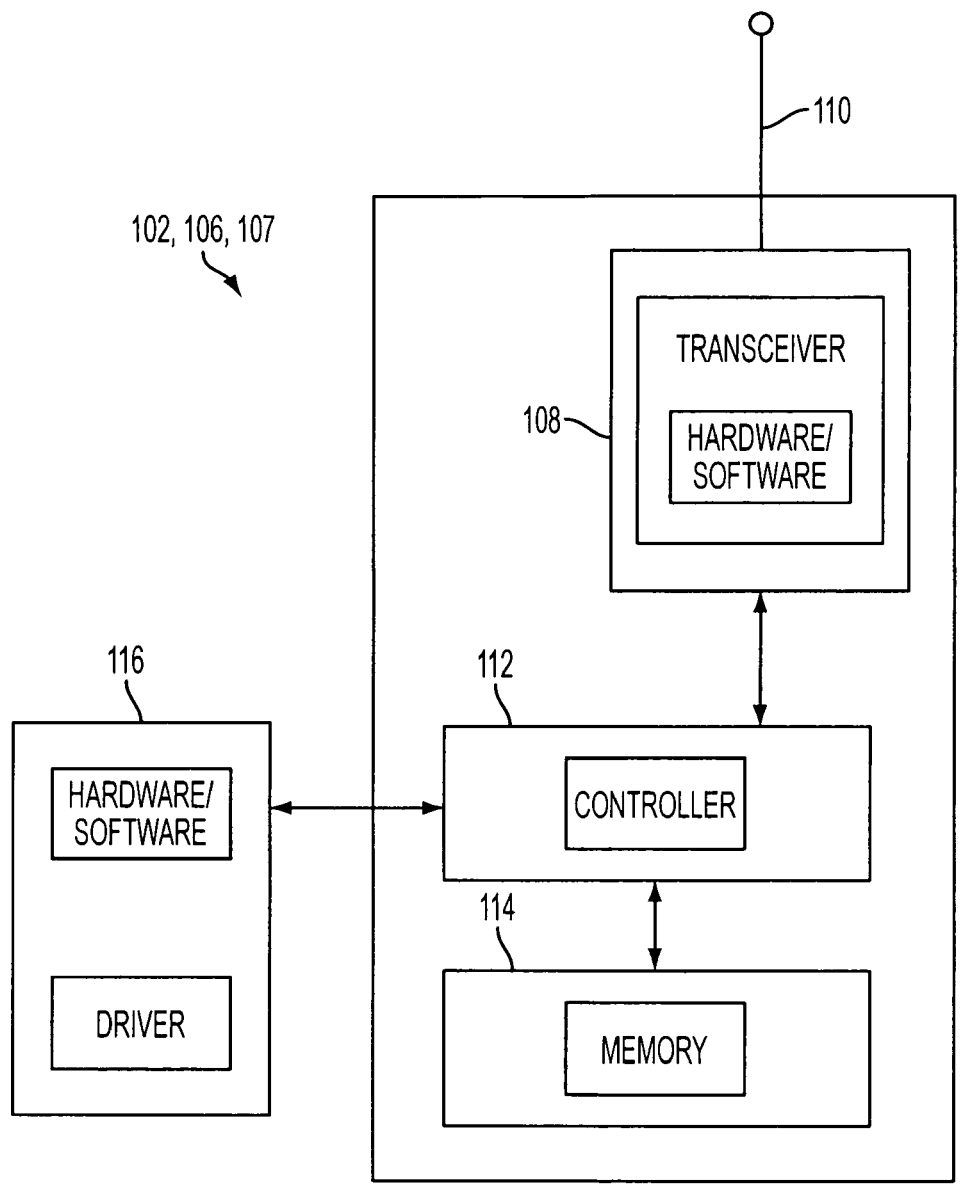
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

According to an embodiment of the invention, the nodes 102, 106 and 107 employ a routing algorithm using a combination of two procedures, namely, a hard routing procedure and a soft routing procedure. The controller 112, for example, and its associated hardware and software, can perform the hard and soft routing procedures in the nodes 102, 106 and 107. The hard routing procedure can be performed by a routing protocol that runs on International Standards Organization (ISO) Layer 2, which is the medium access control (MAC) layer, or on Layer 3, which is the Internet Protocol (IP) layer, as can be appreciated by one skilled in the art. The soft routing procedure can run on the physical layer, for example. The hard routing procedure is used to select a primary route between two nodes based on a prediction of link qualities based on past link qualities, and may be implemented using an Ad-Hoc On-Demand Distance Vector (AODV) protocol or any other routing protocol that can take into account link quality information. As discussed in more detail below, the soft routing procedure is used to select other secondary links for routing packets between the two nodes based on the link qualities determined in the hard routing procedure.

Figure 3:
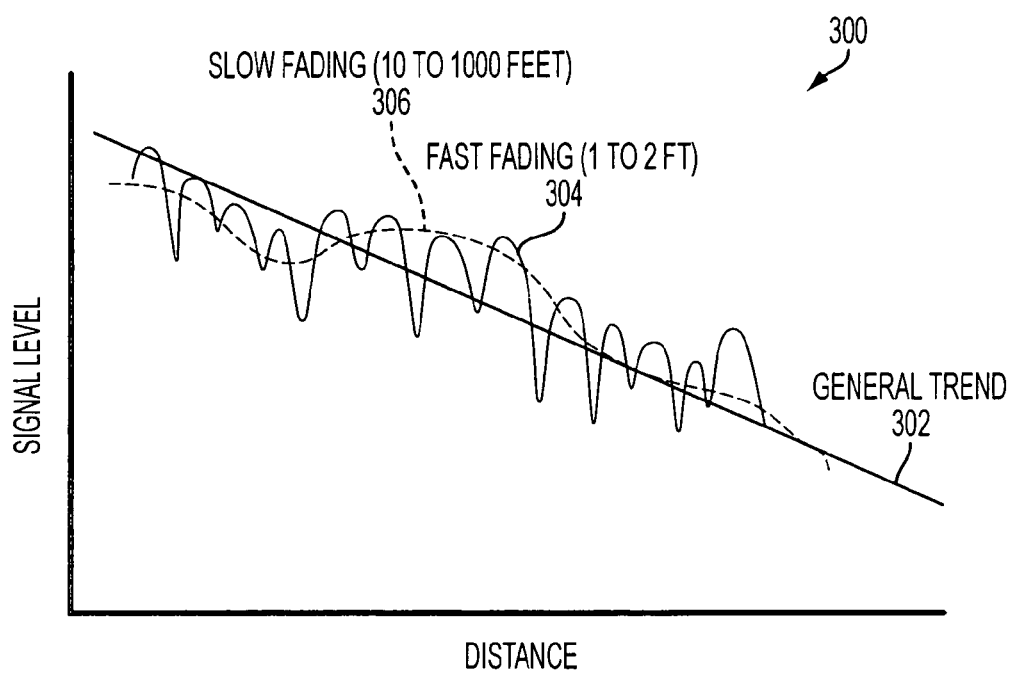
FIG. 3 is a graph illustrating an example of an effect of fading on a link between nodes in the wireless communication network as shown in FIG. 1 relative to the distance between the nodes.

As illustrated in the graph 300 of FIG. 3, the general trend 302 indicates that the signal level decreases as the distance between the nodes increases. Following this general trend 302, multi-path channel fading that occurs includes fast fading 304 and slow fading 306. According to an embodiment of the present invention as described in more detail below, the hard routing procedure reacts to slow fading and the soft routing procedure reacts to fast fading. Slow fading is typically caused by shadowing of the node 102 due to the presence of objects near the node, such as a mobile node 102, and fast fading is typically caused by signal scattering around the node. Moreover, while fast fading is typically Rayleigh distributed, slow fading is typically log-normal distributed and around 10 decibels (dBs) of power.

Figure 4:
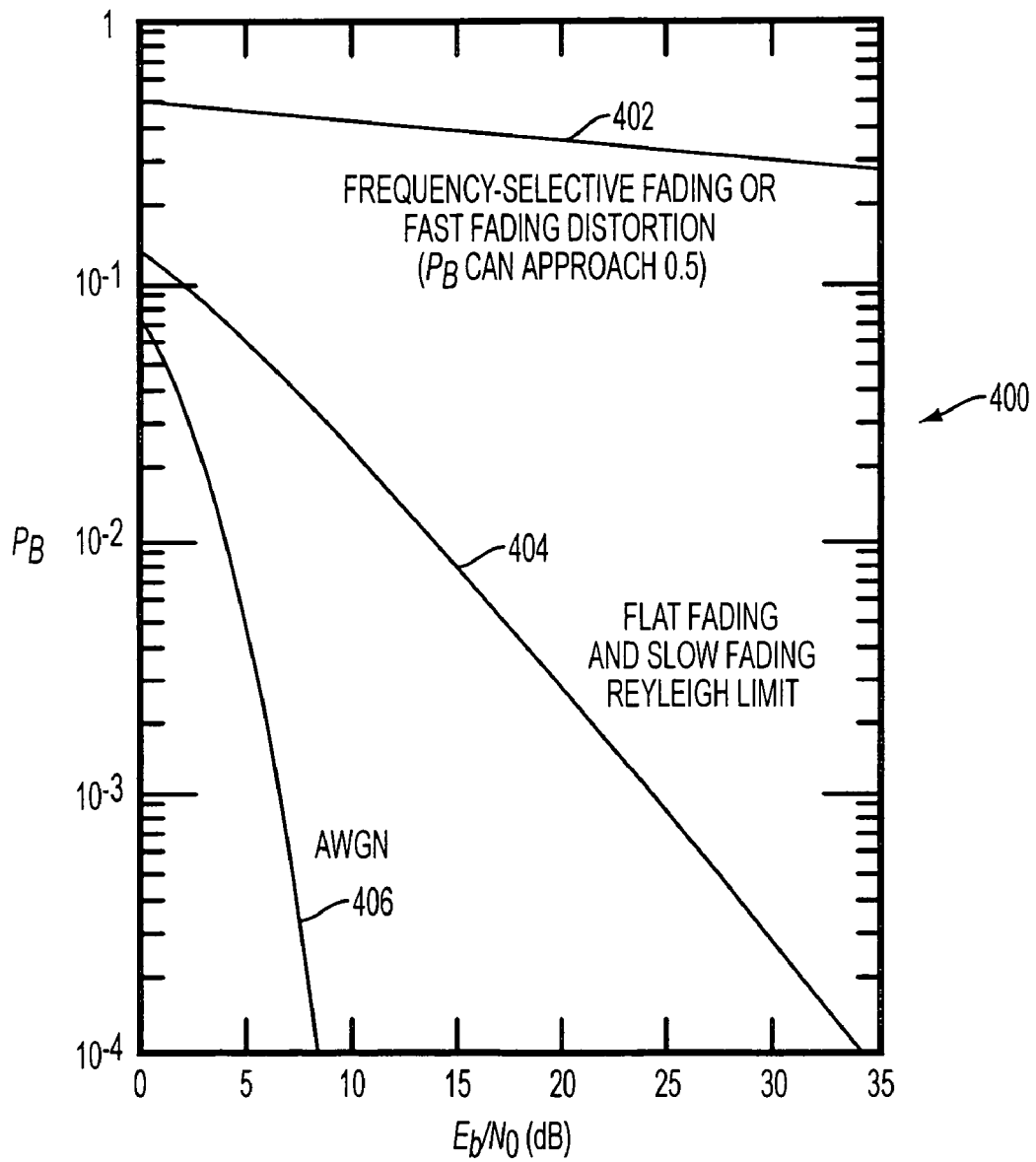
FIG. 4 is a graph illustrating an example of different types of fading that can be experienced by a link between nodes in the network as shown in FIG. 1.

The graph 400 of FIG. 4 further illustrates an example of the effect of Rayleigh fading to bit error rate of a radio link as understood by one skilled in the art, and as discussed in a publication by Bernard Sklar entitled "Rayleigh Fading Channels in Mobile Digital Communications Systems, Part II: Mitigation", Institute of Electrical and Electronics Engineers (IEEE) Communications Mag: 35:102-112, July 1997. As is apparent from FIG. 4, channels experiencing frequency-selective fading 402 have the highest bit error rate (BER), for example, as high as 0.5, and channels experiencing Rayleigh fading 404 exhibit much worse performance than channels experiencing Additive White Gaussian Noise (AWGN) 406. For example, to attain a BER of $10^{-2}$, an energy per bit ($E_b$) to the spectral noise density ($N_0$) ($E_b/N_0$) of 5.5 dB is required in a channel experiencing AWGN 406 while an $E_b/N_0$ of 15 dB is required in channel experiencing Rayleigh fading 404.

Figure 5:
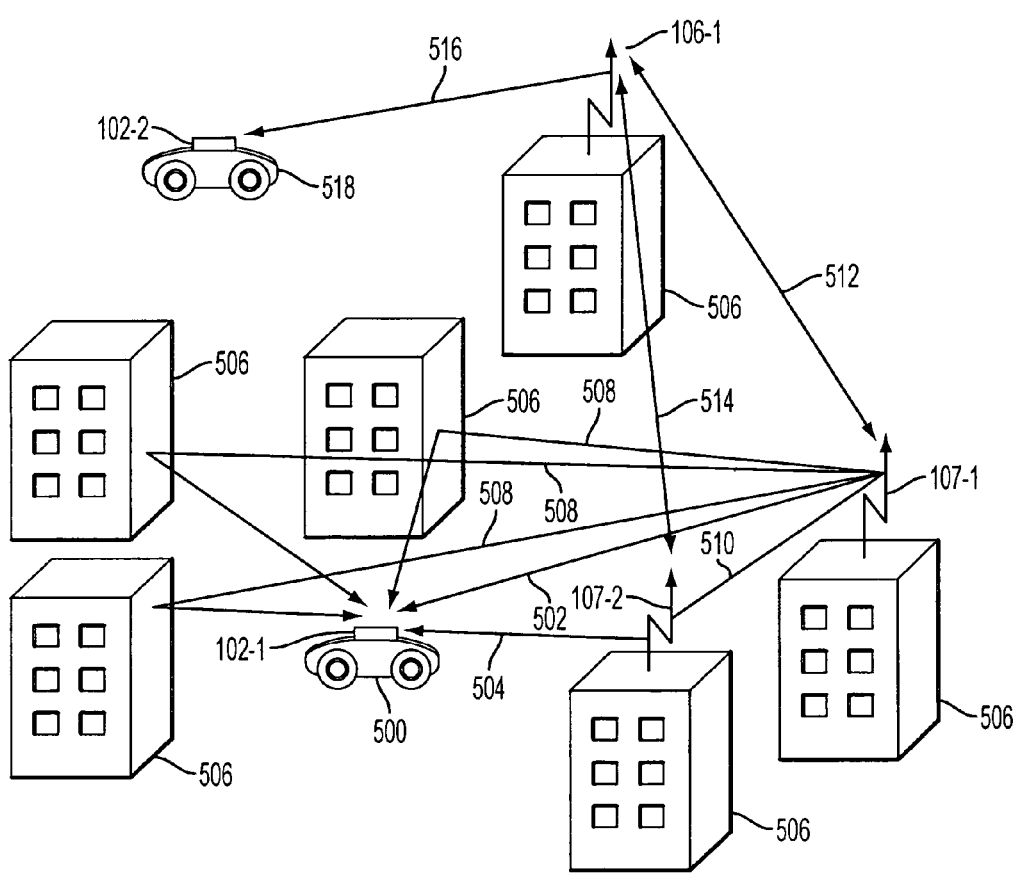
FIG. 5 is a conceptual diagram to illustrate an example of the manner in which routing paths between nodes in the wireless communication network are selected according to an embodiment of the present invention.

FIG. 5 is a conceptual diagram illustrating an example of the manner in which an embodiment of the present invention is implemented in the network 100 as shown in FIG. 1. In this example, a mobile node 102-1 present in a vehicle 500 is capable of communicating simultaneously with two wireless routers 107-1 and 107-2 over links 502 and 504, respectively, which can be the same or different communication channels. The wireless routers 107-1 and 107-2 may be receiving packets from the node 102-1 or transmitting packets to the node 102-1. It is understood in the example illustrated that the packets are being transmitted over links or channels 502 and 504 to achieve the maximum carrier to interference ratio (CIR) on those links.

As further shown, the wireless routers 107-1 and 107-2 are present on respective buildings 506 in this example, and the vehicle 500 is located in an area having several buildings 506 nearby. Accordingly, signals 508 being transmitted by wireless router 107-1, for example, reflect off of the buildings 506 and indirectly reach the mobile node 102-1. These signals 508 result in signal scattering occurring at node 102-1, which can cause fast fading on links 502 and 504, for example. The links 502 and 504 may also experience frequency selective fading and/or flat fading as discussed above with regard to FIG. 4.

Additionally, the wireless routers 107-1 and 107-2 can communicate with each other over link 510, and can each further communication with other wireless routers (not shown), or with an access point 106-1 via links 512 and 514, respectively, in this example. Access point 106-1 therefore functions as an aggregation point where packets transmitted from mobile node 102-1 that are routed by wireless routers 107-1 and 107-2 arrive at the same node (i.e., IAP 106-1). That is, the controller 112 (see FIG. 2), for example, of access point 106-1 can determine based on information in the packets, such as information in the packet header, that the packets were transmitted by node 102-1 but traveled along different paths to reach IAP 106-1. The IAP 106-1 can determine which packets are correctly received, and can further combine packet fragments, as can be appreciated by one skilled in the art. The IAP 106-1 can operate as a router in this example to route the packets via link 516 to a destination mobile node 102-2 present on vehicle 518.

An example of operations performed by the routing algorithm according to an embodiment of the present invention will now be described.

Figure 6:
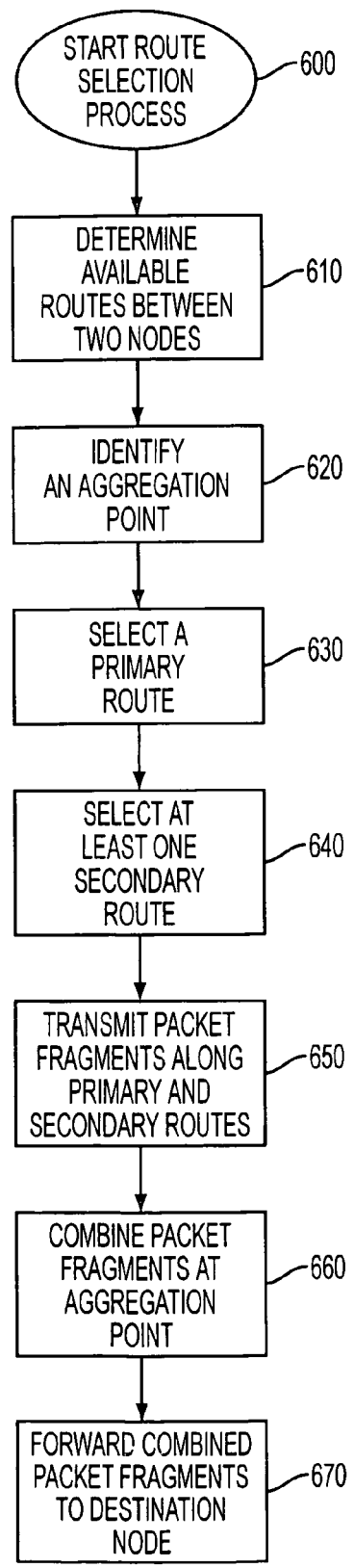
FIG. 6 is a flowchart illustrating an example of operations performed to select primary and secondary routes between two nodes in the network shown in FIG. 1 according to an embodiment of the present invention.

In the example shown in FIG. 5, when a source node 102-1 attempts to send a packet destined for node 102-2, the route selection process begins in step 600 of the flowchart shown in FIG. 6. A hard routing procedure as discussed above is used to determine a primary route to destination node 102-2 before the data packets can be delivered. In step 610, the hard routing procedure determines available routes including a sequence of hops between the source node 102-1 and the destination node 102-2. One route can be, for example, node 102-1 to router 107-1 to IAP 106-1 to node 102-2, and thus three hops long. Another route can be, for example, node 102-1 to router 107-2 to IAP 106-1 to node 102-2, and thus also three hops long.

Accordingly, since the common intermediate node is IAP 106-1, the hard routing procedure identifies IAP 106-1 as the aggregation point in step 620.

The hard routing procedure then selects one of the available routes as the primary route in step 630. The primary route can be, for example, the route including node 102-1 to router 107-1 to IAP 106-1 to node 102-2. A soft routing procedure as discussed above is used to determine at least one secondary route in step 640. A secondary route can be, for example, node 102-1 to router 107-2 to IAP 106-1 to node 102-2.

To send packets to destination node 102-2 in step 650, the source node 102-1 of the transmission can then transmit packets or packet fragments to router 107-1, which is the next hop of the primary route, and router 107-2, which is the next hop of the secondary route. It is understood, in this example, that the channel coherence time is large relative to the packet length so that the channels used by the links between the nodes along the primary and secondary routes remain relatively constant for the duration during which a packet or fragment is being transmitted. It is also understood for this example that each packet or fragment transmitted by the node 102-1 is short compared to the fading period experienced by the links between the nodes along the primary and secondary routes. The controller 112, for example, of the aggregation point IAP 106-1 can operate in step 660 as a packet selector to select successfully received packets from the primary route and from the secondary route and forwards them to destination node 102-2 in step 670. The packet selector computes the reliability of the secondary routes chosen as a result of the soft routing procedure, based on the packets or fragments received, and provides the software implementing the hard routing procedure with information pertaining to the performance of the secondary routes links. The aggregation point 106-1 can thus perform packet or packet fragment selection in real-time and can measure the quality of the primary and secondary routes, for example, based on the success rate of the packet fragment reception from each of the secondary routes. However, the aggregation point IAP 106-1 can delay transmitting an acknowledgement message, thereby indicating that a packet or fragment is correct for a period of time equal to the propagation delay for a packet or fragment to travel to the aggregation point from the "furthest away" node (e.g. a wireless router 107) that is included in a route to the aggregation point IAP 106-1. This "furthest away" node location can be ascertained from the delay performance of the nodes in the network 100.

It should be noted that the primary route is statistically the "best" route to the aggregation point IAP 106-1 that was selected by the hard routing procedure as determined by past transmission quality. The primary route is the route used if the available bandwidth capacity among the wireless routers 107-1 and 107-2 and IAP 106-1 is not adequate for the secondary route. For example, if the IAP 106-1 is becoming overloaded, then packets on secondary routes may be discarded since they only affect the packet error performance of the network 100. However, packets or fragments being transmitted along the primary route are delivered to the destination node 102-1, and packets or packet fragments being transmitted along secondary routes are delivered if possible. The aggregation point IAP 106-1 attempts to deliver only correct packet or correct packet fragments to the application layer, and erroneous packets are discarded by the transport control layer of the IAP 106-1.

As discussed above, an aggregation point can be the first point (e.g., a single node) that is shared or is common between the primary and secondary multihop routes, as measured from the transmitting node. In other words, the aggregation point can be the first wireless router 107 or IAP 106 that receives the packets or fragments transmitted by the mobile node 102-1 that were routed along the primary and secondary routes. The location and identity of the aggregation point can be reevaluated or changed in response to a change in the routing such as when a new primary route is selected, for example, or when a previously selected secondary route becomes a primary route.

The hard routing procedure, in this regard, can predict the links, add new secondary routes, and remove poorly-performing routes. The hard routing procedure can determine which route is the primary route and which are the secondary routes based on the measured success of the secondary routes.

The hard routing procedure, according to an embodiment of the invention, adds and removes new secondary or soft routes depending on successful packet delivery statistics; and decides what route is the primary route. For example, if two secondary routes are used and only one secondary route produces correct packets, the second (errored) secondary route can be removed. The removed route is always the secondary route, since the best performing route is the primary route. New secondary routes are selected, for example, to include nodes such as other wireless routers that have high speed links to the aggregation point IAP 106-1. Also, the hard routing procedure can change the aggregation point, since the hard routing procedure can optimize the point at which the secondary routes join. Additionally, a node such as a mobile node 102, IAP 106 or wireless router 107 can transmit information pertaining to the selected aggregation point, primary route, and second routes to other nodes 102, 106 and 107 in the form of, for example, "hello" messages, so that these other nodes 102, 106 and 107 can update their routing tables based on that information as can be appreciated by one skilled in the art.

In addition, new secondary routes can be selected based on hello messages that are heard by the infrastructure nodes such as IAPs 106 and wireless routers 107.

For example, when a wireless router 107 receives a hello message from the mobile node, the controller 112, for example, in the wireless router 107 can measure the quality of the hello message (e.g., by statistical analysis) and the hard routing procedure, for example, can use this measurement to determine whether to add another secondary route. When the quality of the route exceeds one of the active secondary routes that are receiving signals from the mobile node 102-1, this new secondary route can be added, and the worst performing secondary route can be removed.

It should further be noted that it is possible according to an embodiment of the present invention that mobile nodes 102 will use secondary or soft routes to transmit packets or packet fragments, while infrastructure nodes such as IAPs 106 and wireless routers 107 may use conventional routing algorithms to route packets. Additionally, packet selection may be performed, in some embodiments, only when there is excess capacity that can be used for delivering fragments to an aggregation point. Thus, wireless routers and access points can have much higher data rates between them that can be used for soft routing.

It should also be noted that if the hard routing procedure determines that only one possible path or route exists to a selected aggregation point, then a secondary route cannot be defined and it is not necessary to perform a soft routing procedure. If, on the other hand, there are two or more possible paths for packets to a selected aggregation point, then a soft routing procedure (e.g., running on the physical layer) can be used to select, in real-time, a next hop for packets from amongst possible next hops identified by the hard routing procedure.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for routing data between a first node and a second node in a wireless communication network, the method comprising:
   identifying a plurality of possible routes between the first and second nodes;
   selecting a node of the wireless communication network to operate as an aggregation point that is a common node in at least two of the possible routes;
   selecting one of the possible routes as a primary route for routing the data between the first and second nodes;
   selecting at least one secondary route, from among the possible routes other than that selected as the primary route, for routing the data between the first and second nodes such that the data is routed as data packet fragments along the primary route and said at least one secondary route, wherein the primary route and said at least one secondary route each include the aggregation point; and
   operating the aggregation point to combine the data packet fragments that meets a desired condition and to forward the combined data packet fragments to the second node.

2. The method of claim 1, further comprising:
   operating the aggregation point to receive the data from the primary route and said at least one secondary route, and to determine which portions of the received data is to be forwarded to the second node.

3. The method of claim 1, further comprising:
   operating the aggregation point to forward to the second node those of the data packet fragments that meets the desired condition.

4. The method of claim 1, wherein:
   the primary route selecting step selects one of the possible routes that has a link quality meeting a desired condition as the primary route; and the secondary route selecting step selects at least one of the possible routes that has a desired rate of success of the data reaching the aggregation point as said at least one of the secondary routes.

5. The method of claim 1, further comprising:
assessing a rate of success of the primary route to route the data to the aggregation point and a respective rate of success of each of the secondary routes to route the data to the aggregation point; and
when the rate of success of the primary route becomes less than the rate of success of any of the secondary routes, redesignating the secondary route having the highest rate of success to be the primary route.

6. The method of claim 1, further comprising:
changing a number of the secondary routes based on information exchanged between the nodes.

7. The method of claim 1, further comprising:
assessing a respective rate of success of each of the secondary routes to route the data to the aggregation point; and
eliminating the secondary route having the lowest rate of success.

8. The method of claim 1, wherein:
the aggregation point selecting step and the primary route selecting step comprise performing a hard routing procedure to select the aggregation point and the primary route; and
the secondary route selecting step comprises performing a soft routing procedure to select said at least one of the secondary routes.

9. The method of claim 1, wherein:
the wireless communication network is a multihopping wireless communication network;
the aggregation point is a wireless router in the multihopping wireless communication network; and
the first and second nodes are each mobile nodes.

10. A wireless communication network, comprising:
a plurality of nodes to perform a procedure for routing data between first and second nodes by identifying a plurality of possible routes between the first and second nodes, selecting one of the nodes to operate as an aggregation point that is a common node in at least two of the possible routes,
selecting one of the possible routes as a primary route for routing the data between the first and second nodes, and selecting at least one secondary route, from among the possible routes other than that selected as the primary route, for routing the data between the first and second nodes, such that the nodes in the primary and said at least one secondary route route the data as data packet fragments, wherein the primary route and said at least one secondary route each include the aggregation point, wherein the aggregation point combines the data packet fragments that meets a desired condition, and forwards the combined data packet fragments to the second node.

11. The wireless communication network of claim 10, wherein:
the node operating as the aggregation point receives the data from the primary route and said at least one secondary route, and determines which portions of the received data is to be forwarded to the second node.

12. The wireless communication network of claim 10, wherein:
the node operating as the aggregation point forwards to the second node those of the data packet fragments that meet the desired condition.

13. The wireless communication network of claim 10, wherein:
the nodes select one of the possible routes that has a link quality meeting a desired condition as the primary route; and
select at least one of the possible routes that has a desired rate of success of the data reaching the aggregation point as said at least one of the secondary routes.

14. The wireless communication network of claim 10, wherein:
the nodes assess a rate of success of the primary route to route the data to the aggregation point and a respective rate of success of each of the secondary routes to route the data to the aggregation point; and
redesignate the secondary route having the highest rate of success to be the primary route when the rate of success of the primary route becomes less than the rate of success of any of the secondary routes.

15. The wireless communication network of claim 10, wherein:
the nodes exchange information pertaining to the secondary routes and to change a number of the secondary routes based on the exchanged information.

16. The wireless communication network of claim 10, wherein:
the nodes assess a respective rate of success of each of the secondary routes to route the data to the aggregation point, and to eliminate the secondary route having the lowest rate of success.

17. The wireless communication network of claim 10, wherein:
the nodes perform a hard routing procedure to select the aggregation point and the primary route, and perform a soft routing procedure to select said at least one of the secondary routes.

18. The wireless communication network of claim 10, wherein:
the wireless network is a multihopping wireless network;
the aggregation point is a wireless router in the multihopping wireless network; and
the first and second nodes are each mobile nodes.

* * * * *

UNITED STATES PATENT AND TRADEMARK OFFICE
CERTIFICATE OF CORRECTION

| | | |
|---|---|---|
| PATENT NO. | : 7,706,390 B2 | Page 1 of 1 |
| APPLICATION NO. | : 11/268134 | |
| DATED | : April 27, 2010 | |
| INVENTOR(S) | : Alapuranen | |

It is certified that error appears in the above-identified patent and that said Letters Patent is hereby corrected as shown below:

IN THE SPECIFICATION

In Column 3, Line 15, delete "network." and insert -- network, --, therefor.

In Column 6, Lines 17-19, delete "Accordingly, since the common ............. point in step 620." and insert the same at Line 16, after "long." as a continuation.

In Column 7, Lines 52-61, delete "For example, when a wireless ............. route can be removed." and insert the same at Line 51, after "routers 107." as a continuation.

IN THE CLAIMS

In Column 9, Line 50, in Claim 10, delete "route route" and insert -- route --, therefor.

In Column 10, Line 34, in Claim 15, delete "to change" and insert -- change --, therefor.

In Column 10, Line 40, in Claim 18, delete "to eliminate" and insert -- eliminate --, therefor.

Signed and Sealed this
Twelfth Day of June, 2012

David J. Kappos
*Director of the United States Patent and Trademark Office*